US009354994B2

(12) United States Patent
Coronado et al.

(10) Patent No.: US 9,354,994 B2
(45) Date of Patent: May 31, 2016

(54) PREEMPTIVE RELOCATION OF FAILING DATA

(71) Applicant: International Business Machines Corporation, Armonk, NY (US)

(72) Inventors: Juan A. Coronado, Tucson, AZ (US); Lisa R. Martinez, Escondido, CA (US); Beth A. Peterson, Tucson, AZ (US); Jennifer S. Shioya, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 14/183,333

(22) Filed: Feb. 18, 2014

(65) Prior Publication Data

US 2015/0234719 A1 Aug. 20, 2015

(51) Int. Cl.
*G06F 11/00* (2006.01)
*G06F 11/20* (2006.01)

(52) U.S. Cl.
CPC .................................. *G06F 11/203* (2013.01)

(58) Field of Classification Search
CPC . G06F 11/203; G06F 11/3409; G06F 11/008; G06F 11/0748; G06F 11/3447
USPC ........................................................ 714/47.2
See application file for complete search history.

(56) References Cited

U.S. PATENT DOCUMENTS

| 5,632,012 A | 5/1997 | Belsan et al. |
| 9,229,854 B1 * | 1/2016 | Kuzmin .............. G06F 12/0246 |
| 2005/0028048 A1 | 2/2005 | New et al. |
| 2007/0271434 A1 * | 11/2007 | Kawamura ............ G06F 3/0608 711/165 |
| 2010/0061207 A1 | 3/2010 | Trantham |
| 2011/0191558 A1 * | 8/2011 | Anderson ............... G06F 12/16 711/162 |
| 2012/0221888 A1 | 8/2012 | Frost et al. |
| 2013/0046950 A1 | 2/2013 | Coronado et al. |
| 2013/0262396 A1 * | 10/2013 | Kripalani .......... G06F 17/30289 707/674 |

OTHER PUBLICATIONS

Dictionary definition, retrieved from https://en.wikipedia.org/wiki/Hierarchical_storage_management#Tiered_storage on Sep. 7, 2015.*
Dufrasne et al., "IBM System Storage DS8000 Easy Tier," IBM, ibm.com/redbooks, Aug. 21, 2013, pp. 1-172.

* cited by examiner

*Primary Examiner* — Yair Leibovich
(74) *Attorney, Agent, or Firm* — Zilka-Kotab, PC

(57) ABSTRACT

According to one embodiment, a method for preemptively migrating a failing extent includes receiving information of one or more failure conditions associated with an extent stored in a first storage portion of a first storage tier; predicting a failure of the extent based on the information; selecting a second storage portion located in the first storage tier, a higher storage tier, and/or a lower storage tier; and migrating the extent to the selected second storage portion.

20 Claims, 5 Drawing Sheets

PREEMPTIVE RELOCATION OF FAILING DATA

BACKGROUND

The present invention relates to data storage, and more specifically, this invention relates to preemptive relocation of failing data stored in tiered, hierarchical data storage systems.

An ever increasing amount of computer readable storage space is needed to keep pace with expanding data storage demands. Increasing data storage capacity requires improved storage systems to store, retrieve, update, backup, duplicate, etc., large quantities of data Storage systems typically include one or more storage co &oilers and a variety of storage media, which may work in concert to provide data access to one or more host systems requesting and/or sending data.

A tiered, hierarchical storage system is one such system that includes a variety of storage media of differing performance and/or cost arranged into storage tiers. Such storage media may include solid state drives (SSD), enterprise hard disk drives (HUD), serial advanced technology attachment (SATA) disk drives, tape drives, and other storage devices. Storage of data on particular media and/or tier may be based on performance requirements, frequency of use, necessary levels of protection, and other considerations. Moreover, data may be migrated between tiers, as one or more characteristics of the data may change. Placement of the data in the appropriate storage media and/or tier may facilitate efficient and reliable access to the data, and thus enhance the overall performance of the storage environment.

BRIEF SUMMARY

According to one embodiment, a method for preemptively migrating a failing extent includes receiving information of one or more failure conditions associated with an extent stored in a first storage portion of a first storage tier; predicting a failure of the extent based on the information; selecting a second storage portion located in the first storage tier, a higher storage tier, and/or a lower storage tier; and migrating the extent the selected second storage portion.

According to another embodiment, a computer program product includes a computer readable storage medium having program code embodied therewith, where the program code readable/executable by a processor to: receive information of one or more failure conditions associated with an extent stored in a first storage portion of a first storage tier; predict a failure of the extent based on the information; select a second storage portion located in the first storage tier, a higher storage tier, and/or a lower storage tier: and migrate the extent to the selected second storage portion.

According to yet another embodiment, a system includes logic integrated with and/or executable by a hardware processor, where the logic is configured to receive information of one or more failure conditions associated with an extent stored in a first storage portion of a first storage tier; predict a failure of the extent based on the information; select a second storage portion located in the first storage tier, a higher storage tier, and/or a lower storage tier; and migrate the extent to the selected second storage portion.

Other aspects and embodiments of the present invention will become apparent from the following detailed description, which, when taken in conjunction with the drawings, illustrate by way of example the principles of the invention.

DETAILED DESCRIPTION

Figure 1:
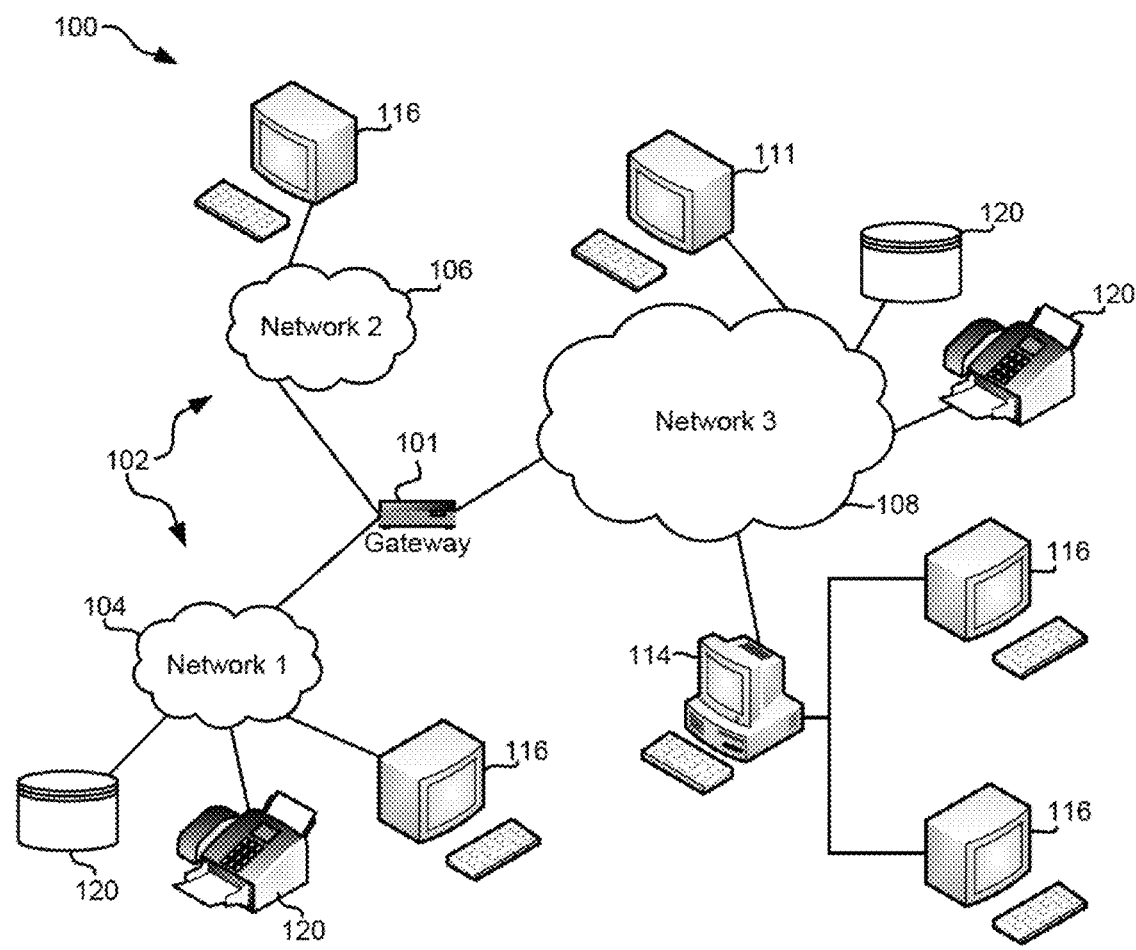
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification specify the presence of stated features, integers, steps, operations, elements, and/or components, but do not preclude the presence or addition of one or more other features integers, steps, operations, elements, components and/or groups thereof.

The following description discloses several preferred embodiments of systems, methods and computer program products for preemptively relocating failing or expected-to-fail data stored in tiered, hierarchical data storage systems.

According to one general embodiment, a method for preemptively migrating a failing extent includes receiving information of one or more failure conditions associated with an extent stored in a first storage portion of a first storage tier; predicting a failure of the extent based on the information; selecting a second storage portion located in the first storage tier, a higher storage tier, and/or a lower storage tier; and migrating the extent to the selected second storage portion.

According to another general embodiment, a computer program product includes a computer readable storage medium having program code embodied therewith, where the program code readable/executable by a processor to: receive information of one or more failure conditions associated with an extent stored in a first storage portion of a first storage tier; predict a failure of the extent based on the information; select a second storage portion located in the first storage tier, a higher storage tier, and/or a lower storage tier; and migrate the extent to the selected second storage portion.

According to yet another general embodiment, a system includes logic integrated with and/or executable by a hardware processor, where the logic is configured to: receive information of one or more failure conditions associated with an extent stored in a first storage portion of a first storage tier; predict a failure of the extent based on the information; select a second storage portion located in the first storage tier, a higher storage tier, and/or a lower storage tier; and migrate the extent to the selected second storage portion.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant s that the processor has logic embedded therewith as hardware logic, such as an application specific integrated circuit (ASIC), a field programmable gate array (FPGA), etc. By executable by the processor, what is meant is that the logic is hardware logic: software logic such as firmware, part of operating system, part of an application program, etc.; or some combination of hardware and software logic that is accessible by the processor and configured to a se the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing, unit (CPU), an integrated circuit (IC), etc.

Referring now to FIG. 1, an architecture 100 is shown in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 selves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
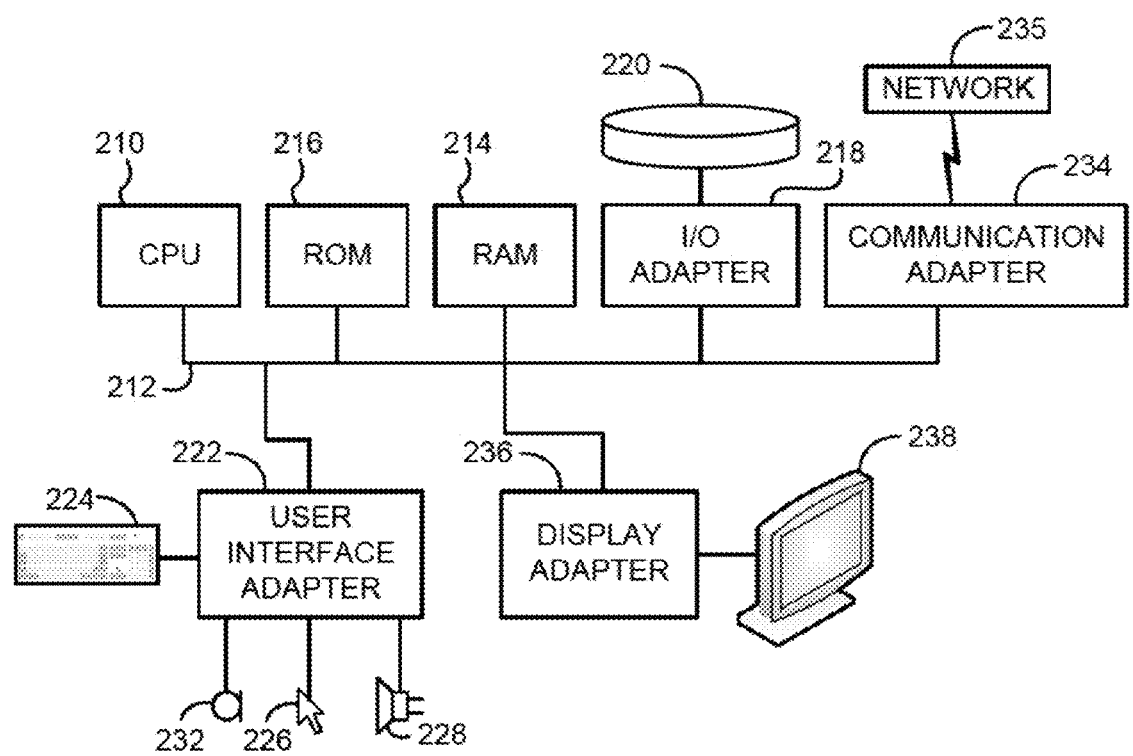
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214. Read Only Memory (ROM) 216, an 110 adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
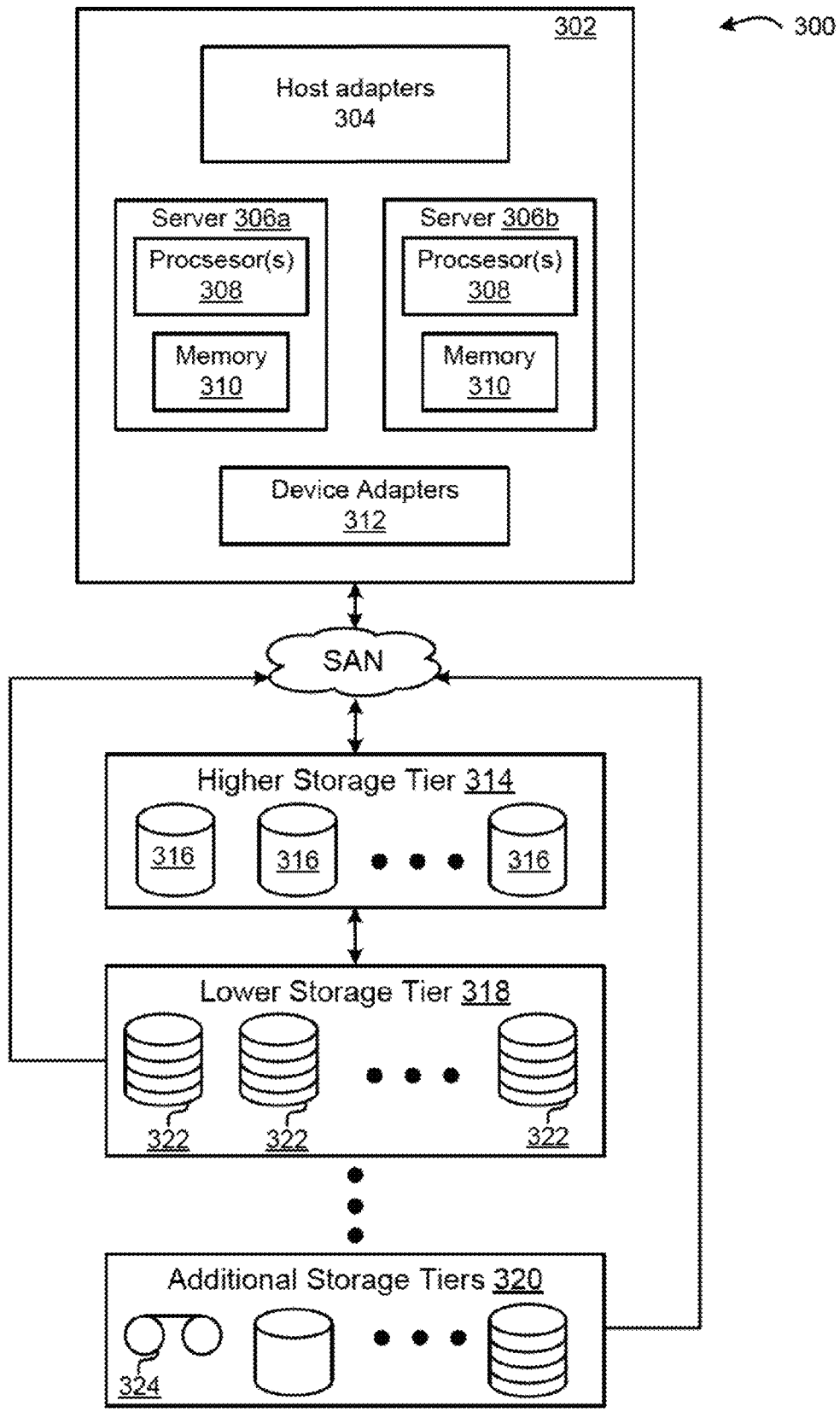
FIG. 3 illustrates a tiered data storage system, in accordance with one embodiment.

Referring now to FIG. 3, a tiered, hierarchical storage system 300 is shown according to one embodiment. As an option, the multi-tiered storage system 300 may be implemented in conjunction with features from any other embodiment listed herein, such as those described with reference to the other FIGS. Of course, the tiered storage system 300 and others presented herein may be used in various applications and/or in permutations which may or may not be specifically described in the illustrative embodiments listed herein. It is also important to note that some of the elements shown in FIG. 3 may be implemented as hardware and/or software, according to various embodiments.

As shown in FIG. 3, the tiered storage system 300 includes a storage controller 302, which may enable one or more hosts (not shown) to communicate with and/or access data stored to a plurality of storage devices (e.g. 316, 322, 324) in one or more storage tiers (e.g. 314, 318, . . . 320). The one or more hosts may communicate with the storage controller 302 via a storage network, such as a storage-area-network (SAN) or a LAN (e.g., when using network-attached storage). In various embodiments, the one or more hosts and storage controller 302 may communicate using a networking standard such as Fibre Channel (FC).

The storage controller 302 shown in FIG. 3 includes one or more host adapters 304 to connect the storage controller 302 to the one or more host devices. In particular embodiments, a host device may communicate over physical connections from one or more ports on a host device to one or more ports on the host adapters 304. A connection may be through a switch, fabric, direct connection, etc.

The storage controller 302 also includes one more device adapters 312 to connect the storage controller 302 to the one or more storage devices (e.g. 316, 322, 324) on the storage tiers (e.g. 314, 318, . . . 320). The storage controller 302 may communicate with the one or more storage devices on the storage tiers through a storage area network (SAN), as shown in FIG. 3.

The storage controller 302 additionally includes one or more servers 306a, 306b, which may provide redundancy to ensure that data is always available to the one or more connected hosts in case one of the servers fails. For instance, if server 306a fails, server 306b may remain functional to allow I/O to continue between the one or more connected hosts and the storage devices. Each server 306a, 306b may include one or more processors 308 and memory 310. In some embodiments, the memory 310 may include volatile memory (e.g. RAM) and non-volatile memory (e.g. ROM, EPROM, EEPROM, hard disks, flash memory, etc.). In preferred embodiments, the volatile memory may include a cache. When a host performs a read operation, the server that performs the read may fetch data from the storages devices (e.g. 316, 322, 324) and save the data in the cache. If this data is requested again by a host, the server may retrieve the data from the cache rather than retrieving it from the storage devices. Likewise, when a host performs a write operation, the server that receives the write request may store the write in its cache and destage/execute the write to the storage devices at a later time.

One example of a storage controller having an architecture similar to the storage controller 302 of FIG. 3, is the IBM DS8000® (Registered Trademark of International Business Machines Corporation) enterprise storage system. The DS8000® is a high-performance, high-capacity storage controller providing disk storage that is designed to support continuous operations. The DS8000® uses servers integrated with IBM's virtualization engine, which provides a partitioning capability that allows division of the servers' resources for different tasks. It is important to note, however, that the storage controllers disclosed herein are not limited to the IBM DS8000® enterprise storage system, but may be any comparable or analogous storage controllers, regardless of the manufacturer, product name, or components or component names associated therewith.

As noted above, the tiered storage system 300 includes any number of storage tiers (e.g. 314, 318, . . . 320). Each tier of the tiered storage system 300 may include one or more storage devices of differing performance and/or cost in one embodiment. These one or more storage devices may include, but are not limited to, hard disk drives (HDDs), solid state drive (SSDs), fibre channel (FC) storage devices, serial advanced technology attachment (SATA) storage devices, sequential access storage devices (tape in tape drives, optical disk in optical disk drives, etc.), direct access storage devices, (CD-ROM. DVD-ROM, etc.), etc. and other such suitable storage devices as would be understood by one having ordinary skill in the art upon reading the present disclosure.

According to particular embodiments, each storage tier of the tiered storage system 300 may include one or more storage devices of a single and particular type, or a combination of different types. For example, in one approach, a higher storage tier 314 may include a majority of SSDs 316 for storing data in a higher performing storage environment, and remaining storage tiers, including lower storage tiers 318 to 320, may include any combination of HDDs 322, tape drives 324, etc., for storing data in a lower performing storage environment. In this way, more frequently accessed data, data having a higher priority, data needing to be accessed more quickly, etc., may be stored to the higher storage tier 314, while data not having one of these attributes may be stored to the lower storage tier 318 and/or additional storage tiers 320. It is important to note that the tiered storage system 300 of FIG. 3 is provided by way of example only and is not intended to be limiting. For instance, in other embodiments, the tiered storage system 300 may include more or fewer tiers than illustrated, different storage media types in each tier, other combinations of storage media types in each tier, etc.

In another embodiment, one, some, a majority, each, etc. storage tier may comprise at least one storage array. A storage array may refer to a group of one or more physical storage devices, according to one approach. The one or more physical storage devices in a particular storage array may all have the same capacity and/or speed. A storage array may also be configured in a redundant array of independent disks (RAID) configuration, according to preferred approaches.

In additional approaches, one or more physical storage arrays may be combined to create a logically contiguous storage space, herein referred to as a rank. The available storage space in a rank may be divided into one or more storage extents, according to more approaches. A storage extent generally refers to a minimum contiguous range of storage capacity on a physical storage device, array, or rank that is occupied by or reserved for a data segment or file. The data that occupies, or is meant to occupy, a storage extent may be referred to herein as an "extent of data," a "data extent", a "contiguous block of data", or simply an "extent" in particular approaches.

In one specific approach, the storage extents in a physical storage device, array, or rank may be substantially uniform in size. For example, the size of each storage extent on a physical storage device, array, or rank may be 256 MB, 512 MB, 1 GB, or 2 GB, etc. In another approach, the size of the storage extent may be determined based on some aspect of the storage media, such as 0.01%, 0.1%, 0.5%, 1%, 2%, 5%, 10%, 15%, 20%, etc., of the total storage capacity of a physical storage device, array, rank, storage tier, etc.

In yet another embodiment, the storage system 300 may include logic configured to keep track of the local volumes in the storage system 300. A logical volume may have one or more logical extents associated therewith. Each logical extent may be associated with and/or point to a physical location (i.e. a physical storage portion) on the storage media in which the actual extent of data is stored. Thus, in one approach, the logic may be configured to create, maintain and/or update an in-memory mapping table. For instance, as an extent of data is migrated from one physical storage portion to another, a pointer associated with the logical extent may be updated to point to the new physical storage portion and the mapping table updated accordingly. In some approaches, updating the pointer may involve deleting the pointer, or any reference, to the original physical storage portion (the storage portion from which the data was migrated). In other approaches, updating the pointer may involve creating a new pointer to point to the new physical storage portion and maintaining the pointer to the original physical storage portion, thus providing redundant copies of the data.

The storage system controller 302 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

According to additional embodiments, the storage system (such as 300) may include logic configured to receive a request to open a data set, logic configured to determine if the requested data set is stored to a lower storage tier 318 of a tiered data storage system 300 in multiple associated portions, logic configured to move each associated portion of the requested data set to a higher storage tier 314 of the tiered data storage system 300, and logic configured to assemble the requested data set on the higher storage tier 314 of the tiered data storage system 300 from the associated portions.

Of course, this logic may be implemented as a method on any device and/or system or as a computer program product, according to various embodiments.

Data in storage systems may need to be replicated for a variety of reasons, such as, for data migration, data backup, data duplication, etc. For instance, as discussed previously, tiered storage systems may store large quantities of customer data. This data is often critical to the customer (e.g. an individual user, a business, etc.). Data loss thus presents a serious problem that needs to be mitigated and/or avoided where possible.

Several approaches have been contemplated to deal with data loss. One contemplated process to prevent data loss involves replicating data between volumes in a primary and secondary pair of storage systems, each having tiered storage devices. In the event a host system determines that a volume in the primary storage system is failing, and/or is otherwise unable to communicate with the primary storage system, the host system may switch to communicate directly with the secondary storage system. This process of switching the primary and secondary storage systems may be referred to as a "failover." IBM's HyperSwap® (Registered Trademark of International Business Machines Corporation) feature facilitates the switching of primary and secondary storage systems in Peer to Peer Remote Copy (PPRC) environments, and is thus one example of an available data replication solution for storage system failures. However, determining whether the volume in the primacy storage system is failing may take an unwanted and extended amount of time, which prolongs the time between noticing a problem (e.g. an event which will trigger a failover) and switching to the secondary storage system. Additionally, switching between primary and secondary storage systems may also take an unwanted amount of time, as various host tables may have to be rebuilt/updated in order to point to the storage devices in the secondary storage system.

Another contemplated approach to preventing data loss via data replication includes creating an instantaneous copy (e.g. a "flash copy) of the contents of a source volume on a target volume. In such an approach, a single request is typically sent from a host system to a storage system, which performs the entire copy operation. After the copy operation has completed, the target volume contains the contents of the source volume as they existed at a single point in time unless target writes have been performed. IBM's FlashCopy® (Registered Trademark of International Business Machines Corporation) feature is one example of such copy technology. IBM's FlashCopy® function is sometimes described as an instance of a time-zero copy or point-in-time copy technology. Although IBM's FlashCopy® operation may take some time to complete, the resulting data on the target volume is presented so that the copy appears to have occurred immediately. In the event that a host system determines that the source volume is failing, the host system may begin using the secondary copy on the target volume. However, if the source volume is not determined to be failing until after the secondary copy of the data on the target volume is also corrupted, data loss may occur.

Yet another contemplated approach to preventing data loss involves preventing access to (e.g. "fencing") volumes that have failed or are determined to be failing so that said volumes cannot be modified (e.g. read, written to, etc.). IBM's Soft Fence feature is one example of such an approach, and generally involves fencing an old primary PPRC volume when an unplanned recovery occurs (e.g. after a HyperSwap® operation). However, fencing the original primary/ source volume causes the original data stored therein to become inaccessible, which may lead to I/O errors.

Additional contemplated approaches to data loss prevention involve preemptively rebuilding an extent and/or an entire volume that has failed. However, these approaches also have several drawbacks. Rebuilding an extent, e.g. using parity, may take an unwanted amount of time and/or resources, which may ultimately decrease the overall performance of the storage system, specifically the storage controller. Moreover, rebuilding an entire volume may take an even longer amount of time and/or resources than rebuilding an extent, further decreasing the overall performance of the storage system and, particularly, the storage controller.

Thus, each of the foregoing approaches have drawbacks that caution away from their use as the sole means of data loss prevention.

Various embodiments described herein overcome the aforementioned drawbacks by providing a faster, completely concurrent way of preemptively migrating a data extent off of "bad" hardware while allowing a user to continue accessing their data during the migration. In various approaches, "bad" hardware may refer to the portion of the storage media to which the data extent is stored and which falls below industry, user, and/or manufacturer standards, does not reliably accept and/or provide data, is determined to be failing or expected-to-fail, etc. In preferred approaches, a storage controller may monitor information associated with extents stored in a tiered storage system in order to determine whether any of the data extents are associated with one or more failure conditions and thus are failing or expected-to-fail. For example, in some approaches, an extent may be determined to be associated with one or more failure conditions where the extent has reported one or more errors, has slowed down in performance, is associated with problems that would otherwise result in a HyperSwap® operation discussed above, etc. In approaches where an extent is determined to be associated with one or more failure conditions, the storage controller may preemptively migrate the extent from its existing location (e.g. storage portion) to another location in the same storage tier and/or a different storage tier.

In particular approaches, the storage controller may preemptively migrate the extent associated with the failure condition(s) from its existing location to another location in the same storage tier, a higher storage tier and/or a lower storage tier according to a predetermined priority of the storage tiers. For example, in one approach, the storage controller may preemptively migrate the extent associated with the failure condition(s) from its existing location to another location in the same storage tier if available, otherwise to another location in a higher storage tier if available, otherwise to another location in a lower storage tier if available. In various approaches, the predetermined priority of storage tiers may be specified/set by a user, a manufacturer, a host system, a default algorithm, the storage controller, etc. However, in other approaches, migration of an extent associated with one or more failure conditions from its existing location to another location in the same storage tier, a higher storage tier, and/or a lower storage tier may proceed according to user preferences, which may or may no coincide with the predetermined priority of storage tiers.

In additional preferred approaches, the migration of data associated with failing spots (e.g. failing portions of the storage media) to new locations within the same storage tier and/or different storage tiers may be proactively prioritized. For example, in some approaches data associated with failing spots may be migrated to new locations within the same storage tier and/or different storage tiers prior to other migration operations (e.g. the migration of data accessed frequently, the migration of data to lower tiers, migration for basic replication processes, etc.). Moreover, in other approaches data associated with failing spots may be proactively (e.g., automatically) migrated, without any user input requesting the migration, to new locations within the same storage tier and/or different storage tiers. Such proactive migration should cause migration of the potentially endangered data to a new location prior to a complete failure of said spots (e.g. the original storage portions in which the data was located).

In yet more preferred approaches, when an extent fails or is expected to fail, the data in the "bad spot" may be automatically moved to a new location determined by the following default algorithm:

(1) If another rank of the same tier is available in the rank and has adequate space to accommodate the "bad spot," migrate the data to this other rank;

(2) Else if a higher tier of storage is available and has adequate space to accommodate the data, migrate to this higher tier;

(3) Else if a lower tier of storage is available and has adequate space to accommodate the data, migrate to this lower tier.

However, in other preferred approaches, a user, customer, etc. may decide and/or be allowed to override the default algorithm (described above) to his/her own wishes. For example, if the user or customer wishes to save the available capacity in his/her higher storage tiers for the hottest data (e.g. the data that is accessed the most frequently), the higher tier of storage may be set as the last location to which data from a "bad spot" would be moved, or even specify that data from a "bad spot" should not be put into a higher tier under any circumstances.

The embodiments disclosed herein involving the preemptive migration of failing or expected-to-fail extents (e.g. those associated with one or more failure conditions) have several advantages over other contemplated data replication, data loss prevention and/or recovery solutions. First, the embodiments disclosed herein may allow a user to have continuous access to the data during the data migration process. Second, as the extents in a tiered storage system may be continually monitored for one or more failure conditions and preemptively migrated before a complete failure thereof, the performance of the tiered storage system, particularly the storage controller, may be improved as compared to existing data replication, data loss prevention, and/or data recovery solutions that take an unwanted amount of time to recognize, designate, fence and/or rebuild a "bad" extent prior to, or after, a complete failure. Moreover, the migration of data at the extent level in the embodiments disclosed herein may occur on a substantially faster timescale than existing solutions which migrate an entire volume. Third, as information associated with the extents may be continually monitored for one or more failure conditions, extents that are failing or expected-to-fail may be detected as soon as possible and thus avoid the need to switch over to a secondary storage system having a copy of the extent stored thereon, such as in a HyperSwap operation®. Fourth, avoiding the need to switch between volumes on primary and secondary storage systems may also avoid the need to fence the old primary volumes, therefore avoiding any possible I/O errors if a user is accessing and/or attempting to access the data stored therein. Fifth, extents may be immediately migrated when determined to be associated with one or more failing conditions, thereby preventing the corruption of a copy of the data (e.g. a flash copy) on a secondary volume. Sixth, as each extent associated with one or more failing conditions may be migrated from its existing location to a second location having the same rank in the same storage tier and/or to a second location in a different storage tier, there would be no need to rebuild the extent. Additionally, migration of expected-to-fail or failing extents affects the performance of the tiered storage system, particularly the storage controller, to a lesser extent than rebuilding an extent, given that the migration occurs on a faster timescale and may require less resources. Seventh, migrating data at the extent level may avoid the need to rebuild the entire volume on which the data is stored during peak hours. For example, rebuilding the volume may occur at a time that would not negatively affect the user's perceived performance.

Figure 4:
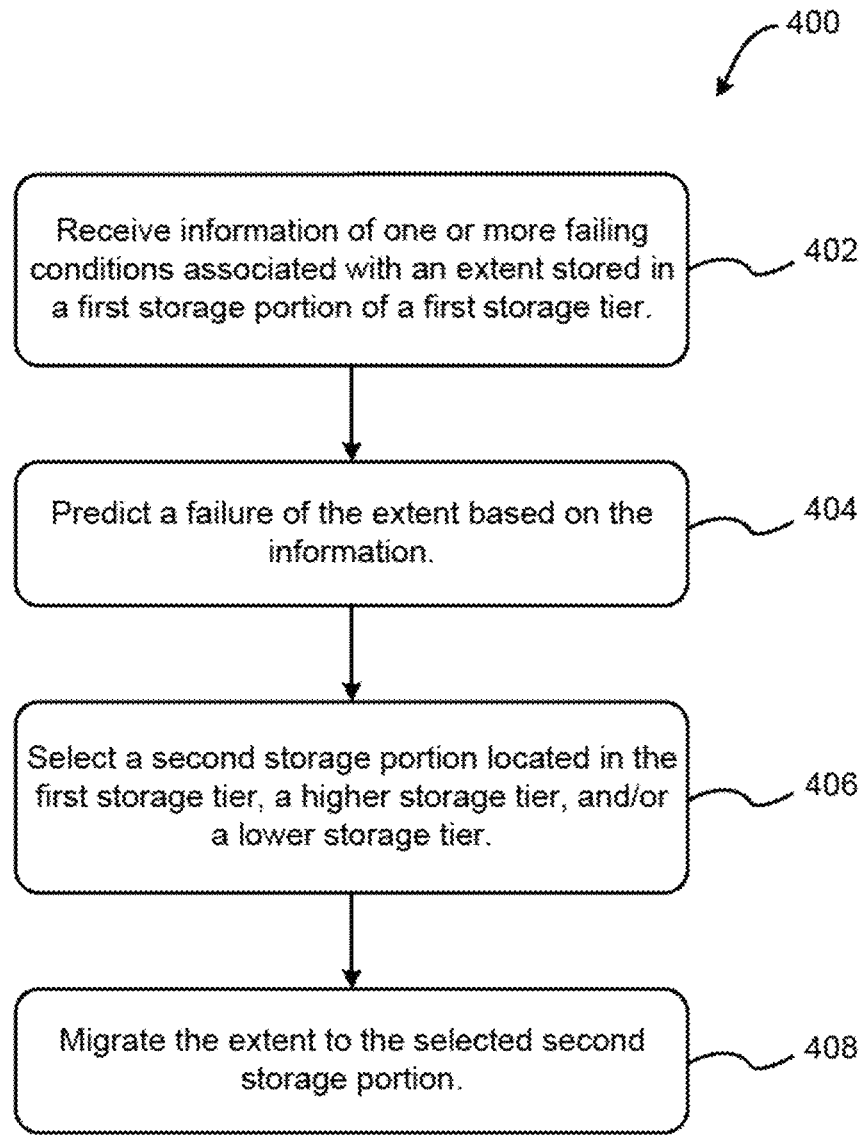
FIG. 4 illustrates a flowchart of a method for migrating failing, or expected-to-fail, data in accordance with one embodiment.

Referring now to FIG. 4, a flowchart of a method 490 for migrating data, more particularly for migrating a failing or expected-to fail extent, is shown according to one embodiment. Of course, more or less operations than those shown in FIG. 4 may be included in method 400, as would be understood by one of skill in the art upon reading the present descriptions.

As an option, the present method 400 may be carried out in any desired environment, including those described herein, and may include embodiments and/or approaches described herein. Moreover, each of the steps of the method 400 may be performed by any suitable component of the operating environment. For example, in various non-limiting embodiments, the method 400 may be partially or entirely performed by a processor, such as a central processing unit (CPU), an application specific integrated circuit (ASIC), a field programmable gate array (FPGA), etc., which may be embedded in and/or operate within a system, an apparatus, a storage controller, a host system, a drive, a storage device, etc., and which may have logic embedded with and/or accessible to the processor.

As shown in FIG. 4, the method 400 includes receiving information of one or more failure conditions associated with an extent stored in a first storage portion of a first storage tier. See operation 402.

In various embodiments, the one or more failure conditions associated with the extent may be due to one or more underlying problems and/or failures associated with the first storage portion (the portion of the underlying physical storage media to which the extent is stored). In other words, an indication that the first storage portion—the actual physical media—is "bad" (e.g. falls below industry, user, and/or manufacturer standards; does not reliably accept and/or provide data, etc.) may manifest itself as one or more failing conditions associated with the extent stored in that first storage portion.

For instance, a failure condition may include one or more errors associated with an extent, in one embodiment. In some approaches, an error may correspond to a write operation and/or read operation that fails to properly execute, is terminated prematurely, etc. In another embodiment, a failure condition may include a performance of the extent that falls below a threshold value. The threshold value may be set by a user, set by a manufacturer, based on historical operating conditions etc. For example, a failure condition may arise when the time it takes to access an extent falls below (e.g. is slower than a predetermined data access rate. In particular, a failure condition may arise when a read and/or write operation is performed at a rate that is slower than a predetermined rate associated with the respective read and/or write operation.

In another embodiment, the method 400 may also include monitoring a number of times that a failure condition associated with an extent occurs. In some approaches, the extent may be monitored periodically, at a predetermined interval specified by a user, a manufacturer, historical operating conditions, an algorithm, etc.

As also shown in FIG. 4, the method 400 includes predicting a failure of the extent based on the information of the one or more failure conditions associated therewith. See operation 404. In one embodiment, the extent may be predicted to fail based on the identity of the one or more failure conditions. In another embodiment, the extent may be predicted to fail based on the number of times and/or the frequency with which the one or more failure conditions (e.g. reported errors, instances of degraded performance, etc.) occur. For instance, an extent may be predicted to fail where the number of times and/or the frequency at which one particular error occurs is equal to or exceeds a threshold value, in specific approaches.

In yet another embodiment, an extent may be predicted to fail based on the information of the one or more failure conditions associated therewith and/or based on special parameters, which may be specified by a user, a manufacturer, a host system, historical operating conditions, etc. In particular, an extent may be predicted to fail when it is associated with one or more flagged errors, according to some approaches. For example, a user may flag one or more specific errors that he/she is particular averse to, either due to previous encounters with the specific error(s), the nature, identity, frequency of the specific error(s), etc., such that an extent associated with the one or more flagged errors may be immediately predicted to hit and/or migrated to a second storage portion, as discussed in detail below.

In a further embodiment, an extent associated with a failure condition that would otherwise not lead to a failure prediction may nonetheless be predicted to fail based on special parameters set by a user, manufacturer, host system(s), etc.

In an additional embodiment, a given storage portion (e.g. the first storage portion) may be flagged by a user, manufacturer, etc., such that an extent stored therein that is associated with any failure condition (e.g. any error, decrease in performance, etc.) may be predicted to fail and/or migrated accordingly even where said failure condition(s) would not otherwise have led to a failure prediction and/or migration. Accordingly, not only may specific failure conditions be flagged by a user, manufacturer, host system, etc., but specific storage portions may be flagged as well.

As additionally shown in FIG. 4, the method 400 includes selecting a second storage portion located in the same storage tier, a higher storage tier, and/or a lower storage tier, and migrating the extent associated with the one or more failing conditions to the selected second portion. See operations 406 and 408, respectively.

In one embodiment, the selection of the second storage portion located in the first storage tier, a higher storage tier and/or a lower storage tier may be based on a priority of the storage tiers. For instance, in one approach, a second storage portion located in the first storage tier may be assigned top priority; a second storage portion in a higher storage tier relative to the first storage tier may be assigned the next highest priority; and a second storage portion in a lower storage tier relative to the first storage tier may be assigned the fluid highest priority. Accordingly, selecting the second storage portion according to this priority of storage tiers may involve:

(1) selecting, as a first option, a second storage portion that is located in the first storage tier (i.e. the same storage tier in which the extent associated with the failure condition is stored) and that has adequate space to accommodate the extent (e.g. can satisfy the performance and capacity requirements associated with the extent), if available;

(2) otherwise selecting, as a second option, a second storage portion that is located in a higher storage tier relative to the first storage tier and that has adequate space to accommodate the extent, if available;

(3) otherwise, selecting, as a third option, a second storage portion that is located in a lower storage tier relative to the first storage tier and that has adequate space to accommodate the extent.

With regard to the first option (i.e. selecting a second storage portion in the first storage tier), the second storage portion may preferably have the same rank as the first storage portion. Moreover, the selection of the second storage portion according to the above priority of storage tiers (i.e. (1) second storage portion in the first storage tier, where the second storage portion and the first storage portion preferably have the same rank; (2) second storage portion in a higher storage tier relative to the first storage tier; and (3) second storage portion in a lower storage tier relative to the first storage tier) may be the default selection process unless otherwise specified or altered by a user, a host system, etc., according to more approaches.

In another embodiment, the selection of the second storage portion located in the first storage tier, a higher storage tier and/or a lower storage tier may be based on priority specified by the user. For example, in some approaches, a higher storage tier relative to the first storage tier may include more expensive and/or faster-to-access storage media than the first storage tier. Thus, a user may want to reserve the available capacity in the highest storage tiers (e.g. those higher than the first storage tier) for the data that is accessed the most (e.g. the "hottest" data). Accordingly, the user may specify that a higher storage tier relative to the first storage tier be selected as the last location to which the extent associated with the one or more failure conditions should be migrated and/or as a location that should never be selected for migration of said extent thereto.

By way of example only, consider a tiered storage system comprising three storage tiers, a higher storage tier including one or more SSDs, a first storage tier including HDDs, and a lower storage tier including tape media. An extent associated with one or more failing conditions and predicted to fail may be moved to a second storage portion, where the second storage portion may be selected based on the following default selection order: (1) a second storage portion of the same rank as the first storage portion and that is located in the first storage tier if available; (2) else, a second storage portion in the higher storage tier if available; (3) else, a second storage portion in the lower storage tier. However, as discussed directly above, a user may reserve the highest storage tiers for the hottest data and instead specify that the second storage portion be selected not according to the default selection process, but rather according to the following exemplary user-specified order: (1) a second storage portion having the same rank as the first storage portion and that is located in the first storage tier if available; (2) else, a second storage portion in the lower storage tier if available; (3) else, a second storage portion in the higher storage tier.

In yet another embodiment, a user may also specify certain storage tiers to which an extent associated with a failure condition may never be migrated. A user may make such specification requests via a user interface (GUI, CLI) and/or host I/O in preferred approaches.

In further embodiments, the extent associated with the one or more failing conditions may be preemptively migrated to the selected second storage portion prior to the complete failure of the extent. For example, while an extent may be associated with a one or more errors and may therefore be expected/predicted to fail, the extent may not have not have failed completely (e.g. become completely inaccessible).

In additional embodiments, the method 400 may further include proactively prioritizing the migration of the failing and/or predicted to fail extent to a new location (e.g. a second storage portion) within the same storage tier (i.e. the first storage tier), a higher storage tier, and/or a lower storage tier. For example, in some approaches the failing and/or predicted to fail extent may be migrated to new locations within the same storage tier and/or different storage tiers prior to other migration operations (e.g. the migration of data accessed frequently, etc.).

In yet other embodiments, after the extent associated with the one or more failing conditions has been migrated to the second storage portion, the method 400 may also include marking/flagging the first storage portion as "defective" or "bad." Designating the first storage portion, the portion of the physical storage media in which the extent was stored, as "defective" or "bad," may help prevent any continued usage of the first storage portion (e.g. any future write requests thereto).

In more embodiments, after the extent associated with the one or more filing conditions has been migrated to the second storage portion, the method 400 may additionally include executing a recovery process associated with the first storage portion. In some approaches, such a recovery process may involve determining whether the first storage portion and/or the original data therein is capable of being rebuilt, and, if so, rebuilding the first storage portion and/or the original data therein (e.g. using parity). After the first storage portion and/or the original data therein is rebuilt, the first storage portion ay then be marked/flagged as "available," indicating that the first storage portion is able to reliably accept and/or provide new data, according to more approaches. In other approaches, the rebuilt storage portion may be returned to its original usage, in other approaches.

However, in approaches where the first storage portion may not be capable of being rebuilt, the first storage portion may be marked as "failed."

In even more embodiments, when a number of extents associated with one or more failing conditions is equal to or exceeds a threshold value, an alert may be issued and/or a determination made as to whether the entire drive (not just the particular storage portions to which the extents are stored) needs to be repaired and/or replaced. Such an alert may be issued to, and/or the determination as to repairing and/or replacing the entire drive may be made by, a user in various approaches. Such an alert may be issued to, and/or the determination as to repairing and/or replacing the entire drive may be made by, a host system in other approaches. Moreover, in more approaches, the threshold value may be specified by a user, a manufacturer, a host system, etc.

Figure 5:
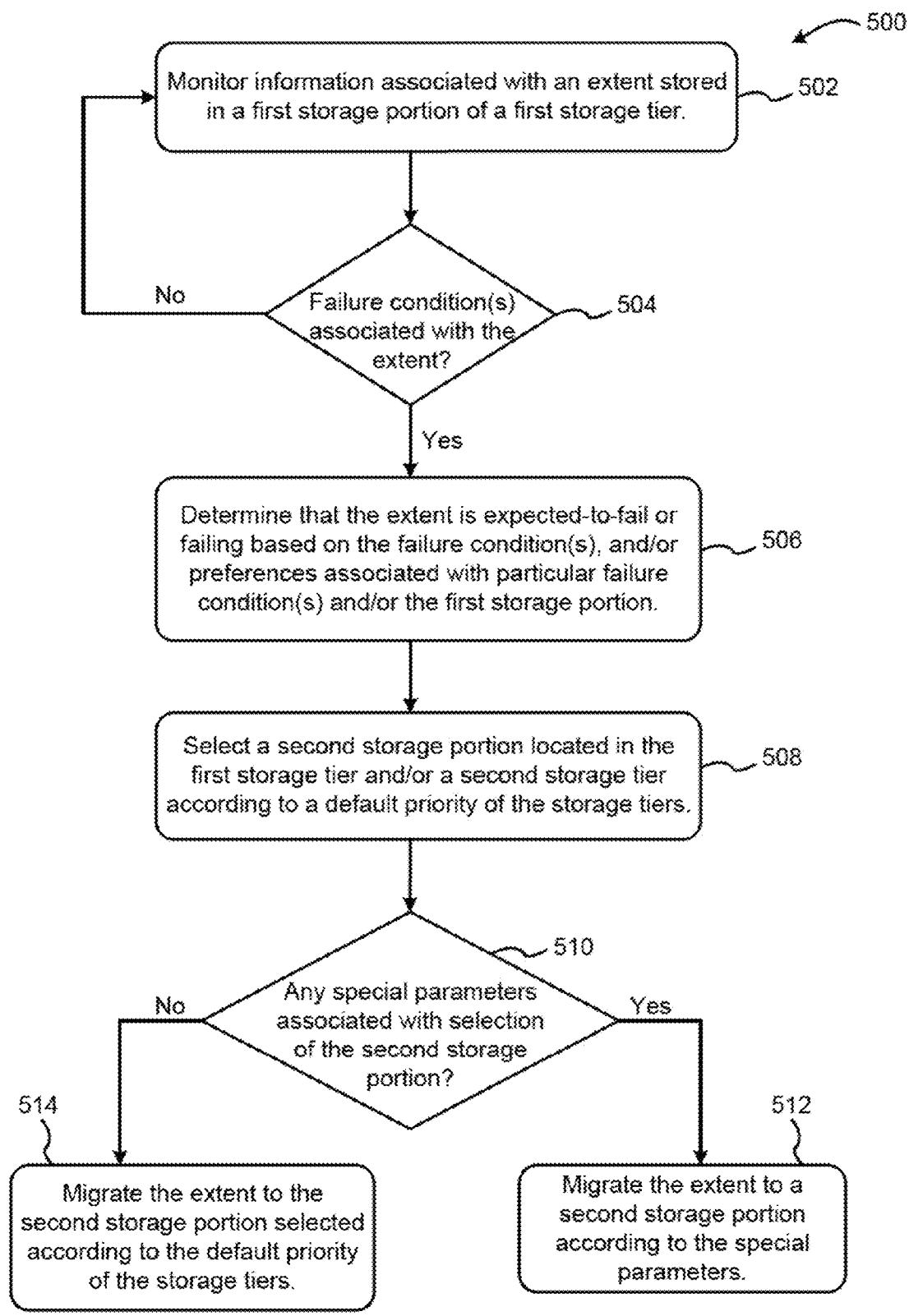
FIG. 5 illustrates a flowchart of a method for migrating, failing, or expected-to-fail, data in accordance with another embodiment.

Referring now to FIG. 5, a flowchart 500 for migrating failing or expected-to-fail extents is shown according to one embodiment. Of course, more or less operations than those shown in FIG. 5 may be included in method 500, as would be understood by one of skill in the art upon reading the present descriptions.

As an option, the present method 500 may be carried out in any desired environment, including those described herein, and may include embodiments and/or approaches described herein. Moreover, each of the steps of the method 500 may be performed by any suitable component of the operating environment. For example, in various non-limiting embodiments, the method 500 may be partially or entirely performed by a processor, such as a central processing unit (CPU), an application specific integrated circuit (ASIC), a field programmable gate an (FPGA), etc., which may be embedded in and/or operate within a system, an apparatus, a storage controller, a host system, a drive, a storage device, etc., and which may have logic embedded with and/or accessible to the processor.

As shown in FIG. 5, the method 500 may initiate with operation 502, where information associated with an extent stored in a first storage portion of a first storage tier is monitored. As discussed previously, an extent lay refer to an extent of data. Additionally, the first storage portion may refer to the physical location of the extent on the storage media. It is important to note that operation 502 may involve monitoring more than one extent at a time. For example, in various approaches, a plurality or all extents may be monitored. However, for the sake of clarity, the steps of method 500 will be described with reference to a singular extent.

In one embodiment, the information associated with the extent may include performance characteristics (e.g. the time for read/write operations, errors associated with read/write operations that failed to initiate or terminated prematurely, temperature of the first storage portion on which the extent is stored, power consumption, etc.), data access characteristics (e.g. the number of times the extent has been accessed over a period of time). etc.

In operation 504, a determination may be made as to whether the extent is associated with one or more failure conditions based on the information. For instance, in one embodiment, the extent may be associated with a failure condition where a performance characteristic associated with the extent falls below a threshold value. In another embodiment, the extent may be associated with a failure condition where the number of identified and/or reported errors is equal to or exceeds a threshold value. Threshold values may be set by a user, set by a manufacturer, derived from a table, based on historical operating conditions, etc. according to various approaches.

If it is determined in operation 504 that the extent is associated with one or more failure conditions, the method 500 proceeds to operation 506; otherwise the method 500 return to operation 502.

In operation 506, the method 500 determines that the extent is expected-to-fail or is failing based on the one or more failing conditions. In particular embodiments, the failure determination in operation 506 may be made according to default operating parameters. For example, in one embodiment, a failure determination made according to default operating parameter may include determining that the extent is expected-to-fail or is failing based on the identity of the one or more failure conditions. For instance, in some approaches, a particular error may be flagged such that an extent associated therewith may be immediately determined to be failing or expected-to-fail. In another embodiment, a failure determination made according to default operating parameter may include determining that the extent is expected-to-fail or is failing based on the number of times and/or the frequency with which the one or more failure conditions (e.g. reported errors, instances of degraded performance, etc.) occur. For example, in more approaches, an extent may be predicted to fail where the number of times and/or the frequency at which one particular error occurs is equal to or exceeds a threshold value.

As also shown operation 506, the method may also include determining that the extent is expected-to-fail or is failing based on preferences associated with particular failure conditions(s). In various approaches, these preferences may be specified by a user, a manufacturer, a host system, historical operating conditions, etc. In particular embodiments, a preference may include one or more flagged failing conditions. For example, in one approach, a user may flag one or more specific errors that he/she is particular averse to, either due to previous encounters with the specific error(s), the nature, identity, frequency of the specific error(s), etc., such that if the extent is associated with the one or more flagged errors, it may be immediately determined as failing or expected-to-fail. In some approaches, these flagged errors may not have otherwise led to a failure determination but for the preferences set by the user.

In more approaches, determining that the extent is expected-to-fail or is failing may additionally be based on preferences associated with the first storage portion. For instance, the first storage portion may be particularly important to a user. Thus, the user may flag the first storage portion, such that if the extent stored therein is associated with any failure condition, the extent may be determined to be failing or expected-to-fail even where said failure condition(s) would not otherwise have led to a failure determination according to default operating parameters. Accordingly, in various approaches not only may these preferences include one or more flagged failure conditions, but flagged storage portions as well. In numerous approaches, these preferences may be specified via user interfaces (GUI, CLI) and/or host I/O.

After it has been determined that the extent is failing, or expected-to-fail, a second storage portion is selected in the same storage tier and/or a second storage tier according to a default priority of the storage tiers. See operation 508. The second storage portion is the location to which the failing or expected-to-fail extent will be migrated. In one embodiment, the second storage portion in the first storage tier has the same rank as the first storage portion (i.e. the storage portion from which the extent will be migrated). In another embodiment, the second storage tier may be a higher and/or lower storage tier relative to the first storage tier.

As noted in operation 508, the selection of the second storage portion is based on a default priority of the storage tiers. For instance, in one approach, a second storage portion that is located in the first storage tier and that has the same rank as the first storage portion may be assigned top priority; and a second storage portion in the second storage tier may be assigned the next highest priority. In approaches where there are at least three different storage tiers, a second storage portion that is located in the first storage tier and that has the same rank as the first storage portion may be assigned top priority; a second storage portion in a higher storage tier relative to the first storage tier may be assigned the next highest priority; and a second storage portion in a lower storage tier relative to the first storage tier may be assigned the third highest priority.

In operation 510, a determination is made as to whether there are any special parameters associated with the selection of the second storage portion. In particular approaches, the special parameters affecting the selection of the second storage portion may alter and/or override the selection of the second storage portion according to the default priority of the storage tiers. For instance in one approach, a user may want to reserve the available capacity in the highest storage tiers (e.g. those higher than the first storage tier) for the data that is accessed the most (e.g. the "hottest" data). Accordingly, the user may specify that a higher storage tier relative to the first storage tier be selected as the last location to which the failing or expected-to-fail extent should be migrated.

In more approaches, a user may also specify certain storage tiers to which the failing or expected-to-fail extent associated may never be migrated.

In yet more approaches, a second storage portion selected according to the special parameters may be the same or different as the selection of the second storage portion according to the default priority of the storage tiers.

In various approaches, these special parameters may be specified by a user, a manufacturer, a host system, historical operating conditions, etc. In numerous approaches, the special parameters may be specified via user interfaces (GUI, CLI) and/or host 110.

If it has been determined that there are special parameters associated with the selection of the second storage portion, the method 500 continues to operation 512 where the extent is migrated to a second storage portion according to the special parameters. However, where there are no special parameters, the method 500 continues to operation 514 where the data is migrated to the second storage portion according to the default priority of the storage tiers.

In some approaches, one or more errors associated with the extent may be verified and/or corrected prior to migration of the extent to the second storage portion. This may be advantageous for data that may be corrupted during the write operation to the first storage portion. In particular approaches, one or more errors associated with the extent may be verified and/or corrected only if the extent is frequently accessed (e.g. qualifies as a "hot" extent) and/or has been recently written to. Whether an extent qualifies as a hot extent may be based on monitoring data access characteristics associated with the extent, such as usage patterns observed over a period of time.

While not shown in FIG. 5, a particular component and/or entity associated with a tiered storage system may be given authority to perform some or all of operations 502-508, in further embodiments. For instance, in one approach, a user may specify that a host monitor information associated with an extent, determine whether the extent is associated with one or more failing conditions based on the information, predict that the extent is failing or expected to fail based on the one or more failure conditions, select the second storage portion to which the extent will be migrated according to a default priority of storage tiers and/or special parameters, and immediately request that the extent be migrated to the second storage portion even if the extent would not have been determined to fail under normal/default operating parameters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for preemptively migrating a failing extent, comprising:
   receiving information of one or more failure conditions associated with an extent stored in a first storage portion of a first storage tier;
   predicting a failure of the extent based on the information;
   selecting a second storage portion located in the first storage tier, a higher storage tier, and/or a lower storage tier; and
   migrating the extent to the selected second storage portion,
   wherein selecting the second storage portion located in the first storage tier, a higher storage tier and/or a lower storage tier is based, at least in part, on a priority of the storage tiers, wherein selecting the second storage portion according to the priority comprises:
      selecting a second storage portion located in the first storage tier when available;
      selecting a second storage portion located in a higher storage tier relative to the first storage tier when a second storage portion in the first storage tier is not available; and
      selecting a second storage portion located in a lower storage tier relative to the first storage tier when a second portion in the higher storage tier is not available.

2. The method as recited in claim 1, wherein the information comprises one or more errors associated with the extent.

3. The method as recited in claim 1, wherein the information comprises a performance of the extent that falls below a threshold value.

4. The method as recited in claim 1, further comprising monitoring a number of times the failure condition occurs.

5. The method as recited in claim 1, wherein the extent is a contiguous block of data.

6. The method as recited in claim 1, wherein the second storage portion located in the first storage tier has a same rank as the first storage portion.

7. The method as recited in claim 1, wherein higher storage tier comprises more expensive and/or faster-to-access storage media than the first storage tier.

8. The method as recited in claim 1, wherein the lower storage tier comprises less expensive and/or slower-to-access storage media than the first storage tier.

9. The method as recited in claim 1, wherein selecting the second storage portion located in the first storage tier, a higher storage tier and/or a lower storage tier is based, at least in part, on a user preference.

10. The method as recited in claim 1, wherein the extent is migrated to the second storage portion prior to the failure of the extent.

11. The method as recited in claim 1, further comprising executing a recovery process of the first storage portion; wherein the recovery process comprises rebuilding the first storage portion.

12. A computer program product, the computer program product comprising a computer readable storage medium having program code embodied therewith, the program code readable/executable by a processor to:
   receive information of one or more failure conditions associated with an extent stored in a first storage portion of a first storage tier;
   predict a failure of the extent based on the information;
   select a second storage portion located in the first storage tier, a higher storage tier, and/or a lower storage tier; and
   migrate the extent to the selected second storage portion,
   wherein selecting the second storage portion located in the first storage tier, a higher storage tier and/or a lower storage tier is based, at least in part, on a priority of the storage tiers, wherein selecting the second storage portion according to the priority comprises:
      selecting a second storage portion located in the first storage tier when available;
      selecting a second storage portion located in a higher storage tier relative to the first storage tier when a second storage portion in the first storage tier is not available; and
      selecting a second storage portion located in a lower storage tier relative to the first storage tier when a second portion in the higher storage tier is not available.

13. The computer program product as recited in claim 12, wherein the information comprises at least one of: one or more errors associated with the extent, and a performance of the extent that falls below a threshold value.

14. The computer program product as recited in claim 12, wherein the second storage portion located in the first storage tier has a same rank as the first storage portion.

15. The computer program product as recited in claim 12, wherein higher storage tier comprises more expensive and/or faster-to-access storage media than the first storage tier, and wherein the lower storage tier comprises less expensive and/or slower-to-access storage media than the first storage tier.

16. The computer program product as recited in claim 12, wherein the extent is migrated to the second storage portion prior to the failure of the extent.

17. A system, comprising logic integrated a hardware processor, the logic being configured to cause the processor to:
   receive information of one or more failure conditions associated with an extent stored in a first storage portion of a first storage tier;
   predict a failure of the extent based on the information;
   select a second storage portion located in the first storage tier, a higher storage tier, and/or a lower storage tier; and
   migrate the extent to the selected second storage portion,
   wherein selecting the second storage portion located in the first storage tier, a higher storage tier and/or a lower storage tier is based, at least in part, on a priority of the storage tiers, wherein selecting the second storage portion according to the priority comprises:
      selecting a second storage portion located in the first storage tier when available;
      selecting a second storage portion located in a higher storage tier relative to the first storage tier when a second storage portion in the first storage tier is not available; and
      selecting a second storage portion located in a lower storage tier relative to the first storage tier when a second portion in the higher storage tier is not available.

18. The system as recited in claim 17, wherein the information comprises at least one of: one or more errors associated with the extent, and a performance of the extent that falls below a threshold value.

19. The system as recited in claim 17, wherein the extent is migrated to the second storage portion prior to the failure of the extent.

20. The system as recited in claim 17, wherein the extent is a contiguous block of data.

* * * * *